United States Patent [19]

Starr

[11] Patent Number: 4,916,976

[45] Date of Patent: Apr. 17, 1990

[54] INFINITELY CONTINUOUSLY VARIABLE DRIVE TRANSMISSION

[76] Inventor: John H. Starr, P.O. Box 332, Hustisford, Wis. 53034

[21] Appl. No.: 302,916

[22] Filed: Jan. 30, 1989

[51] Int. Cl.[4] .................... F16H 37/10; F16H 37/06
[52] U.S. Cl. .................................. 475/115; 475/186; 475/187; 475/191
[58] Field of Search ................ 74/690, 691, 796, 194, 74/196

[56] References Cited

U.S. PATENT DOCUMENTS

| | | | |
|---|---|---|---|
| 888,761 | 5/1908 | Snyder et al. | 74/796 |
| 2,029,042 | 1/1936 | Turner | 74/691 X |
| 2,734,397 | 2/1956 | Bade | 74/796 X |
| 2,747,434 | 5/1956 | Bade | 74/796 |
| 3,802,295 | 4/1974 | Lemmens | 74/796 |
| 4,026,166 | 5/1977 | Jackson | 74/796 X |
| 4,524,642 | 6/1985 | Fritsch | 74/796 |

FOREIGN PATENT DOCUMENTS 3217592 11/1983 Fed. Rep. of Germany ........ 74/690

*Primary Examiner*—Dwight G. Diehl

[57] ABSTRACT

A hydraulically, vacuumatically controlled infinitely variable speed drive transmission connecting an input shaft to an output shaft, comprising a plurality of sets of adhesion rollers mounted radially of the input and output shafts in diammetrically opposed relation to one another. The adhesion rollers are movable radially of input and output shafts under centrifugal force imparted thereto by the rotation of the aforesaid shafts. A pair of self-adjusting, floating disks are mounted to either side of said adhesion rollers and are engageable with said rollers at varying radial distances of the rollers from the axis of the input and output shafts whereby to vary the rate of rotation of said disks. The transmission further includes a planetary gear arrangement for coupling the input shaft to the output shaft and which is responsive to variations in the rate of rotation of the disks to cause the speed ratio between the input and output shafts to correspondingly vary.

11 Claims, 2 Drawing Sheets

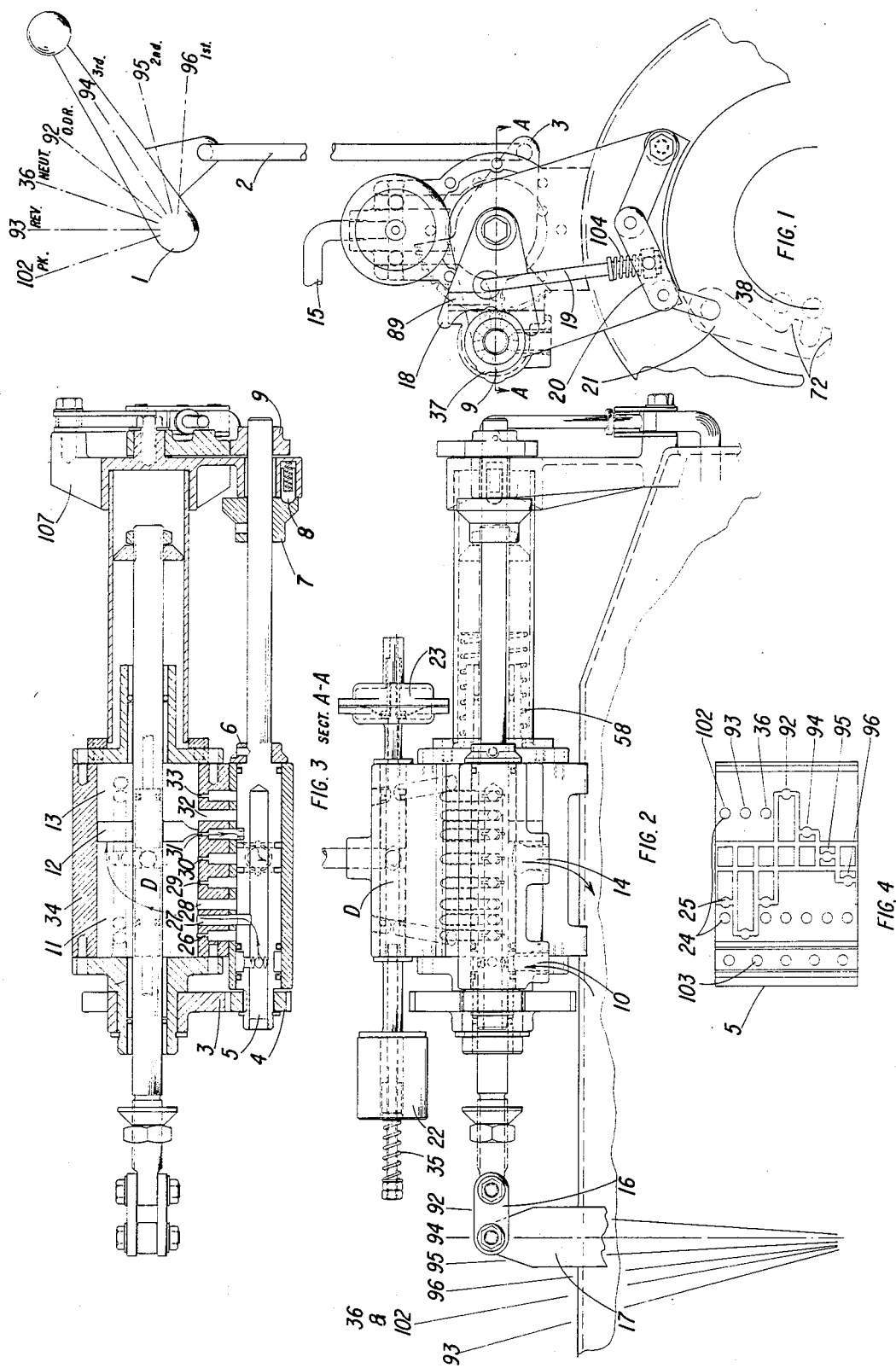

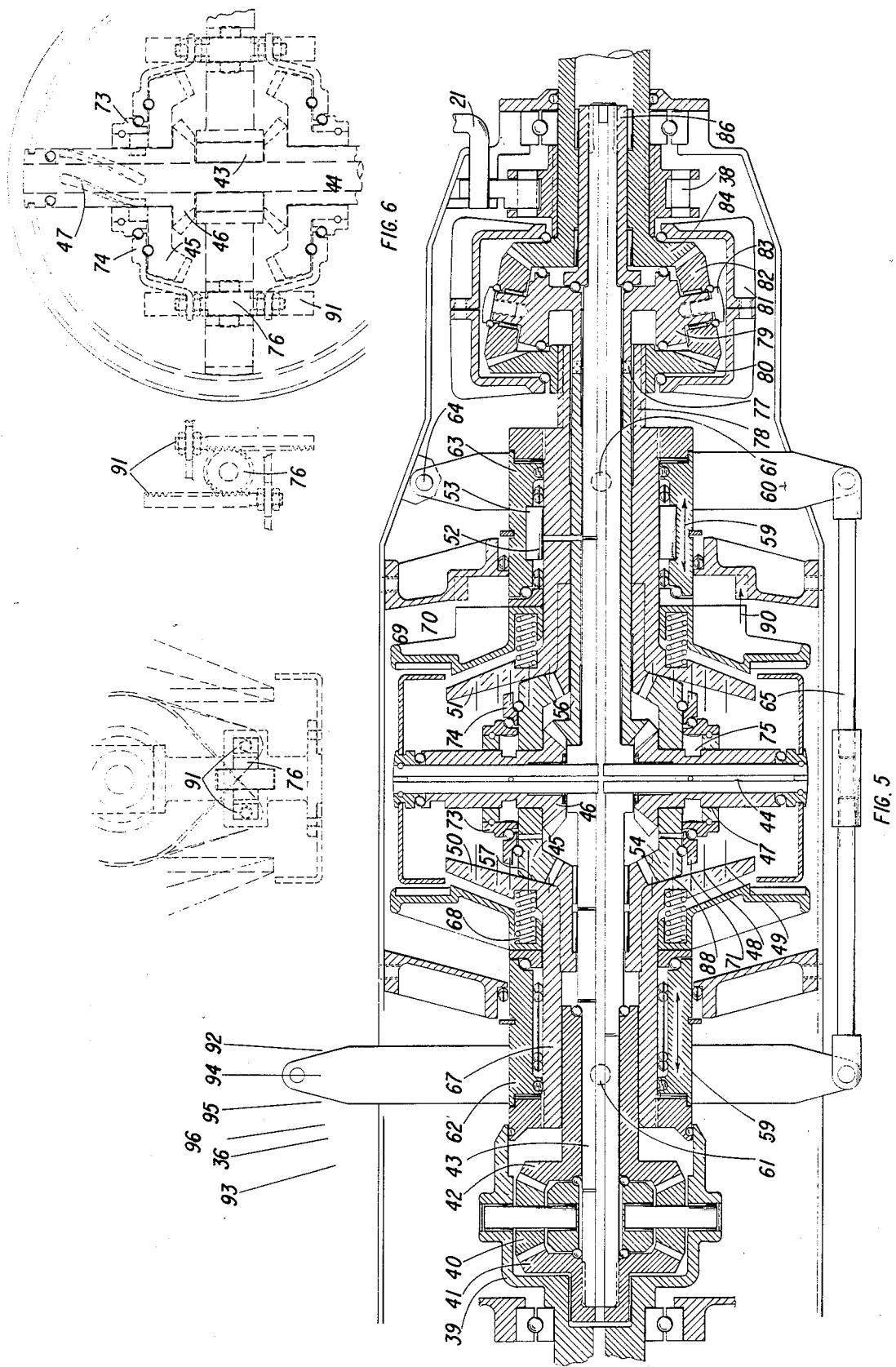

INFINITELY CONTINUOUSLY VARIABLE DRIVE TRANSMISSION

SUMMARY OF THE INVENTION

In the conventional transmissions the use of costly clutches is a necessity. This operation is not as smooth an acceleration as by the use of planetary rolls and pressure adhesive plates that start at a neutral position with a ratio of one to zero. There is no known type of an infinitely variable drive transmission with radially slidable epicyclic rolls with adjacent integral gears that will engage with axially mounted gears as the desired speed of the output shaft has been reached; thereby depending not only upon the adhesion of the rolls with the axially mounted pressure plates for the output torque but with gearing.

It is the object of this present invention to provide an infinitely continuously variable drive transmission where the output drive shaft torque and rotation in either direction starting at zero with infinitesimal degrees of acceleration can be accomplished without any additional mechanism.

Another object of the present invention is to provide an infinitely continuously variable drive transmission with an overdrive mechanism that leaves all the planetary gearing at a static relation to the main longitudinal axis putting all but the main axial bearings to rest while in overdrive.

Another object of the present invention is to provide an infinitely continuously variable drive transmission that has no gear splits to match to the differences in input horsepower of different engines.

Another object of the present invention is to provide an infinitely continuously variable drive transmission that can be controlled in a multitude of ways; the benefits of todays technology.

Objects and benefits other than above enumerated will be evident from the following description and accompanying drawings as understood when read:

FIG. I An end elevation of the integral hydraulic control mechanism of the present invention.

FIG. II is the elevation along the axial lines of the hydraulic control unit integral with the transmission embodying the present invention.

FIG. III is a cross sectional view on the plane A—A of FIG. I.

FIG. IV is the circumferential view of the control spool showing holes and channels that direct the hydraulic oil flo.

FIG. V is a cross sectional view along the axial lines of the transmission embodying the present invention.

FIG. VI is a partial view of the transmission showing the counter balance mechanism of the planetary rolls and gears.

In general this present invention is comprised of a variable speed input shaft which transmits power to an independent infinitely variable speed output shaft in a manner of infinite degrees of acceleration within a given range. The driving torque is introduced to the transmission via a differential gearing splitting the load of torque between the radially supported planetary rollers with integral inner gears, and the longitudinally sliding conical obtuse pressure adhesive plate; to react with the primary torque of this first plate and planetary rollers there is a second similar conical reaction plate; in the space between the two facing conical plates are located the roller carrying shafts radiating from the central primary torqueshaft. The planetary rollers rotating upon the radial shafts are positioned at different equidistances from the center of the longitudinal shaft by slidably shifting the two conical plates; together for a faster forward, apart to a gradual neutral an inbetween location, and farther on apart from neutral to the maximum ratio for reverse; selecting the positions of the conical plates for different speeds and reverse of the output shaft of the present invention is accomplished by a conventional shifting lever that controls a spool valve which directs the hydraulic pressure which positions a piston the rod of said piston is connected to the free floating contol arm that slidably shifts the conical plates.

The planetary rollers interacting with the conical plates are positioned by the centrifugal force accompanied by helix in the bore of the rollers slidably mating with the hubs of the inner most planetary gears on the radial shafts.

This and various other aspects of this invention will be related to in more detail in the following

DESCRIPTION IN DETAIL

This refers to the drawings with like numerals designating like parts.

Segment gear 3 has sixty four teeth meshing twenty four teeth of pinion 4 for a ratio that will revolve spool 5 one revolution thru the complete range of the shift lever 1.

All the ports as at 25 in conjunction with the channels of 5 are exhaust ports and do not extend thru the wall of spool 5.

All nine holes as at 24 extend thru the wall of 5 and are inlet ports. On spool 5, ports 101 for neutral, are spaced as those for park 102; thus the transmission in neutral coupled with the pawl 21 in the lock position as accomplished by the geneva mechanism as the shift lever 1 is in the park position 102 constitutes the total park.

The hydraulic fluid enters under pressure at 10 thru the five drilled ports as at 103 of spool 5 into the drilled chamber E from there to be directed to the cylinder chambers 11 and 13 as the selection of the spool 5 dictates.

As shown the shift lever 1 is in simulated third gear -high-, in shifting lever 1 to park, rod 2 rotates the arm 3 with a segment of a sixty four tooth gear in mesh with 4 a twenty four tooth pinion keyed to spool 5 which is rotated so that the hydraulic fluid inlet holes 24 and outlet holes 25 of spool 5 align with holes 27 32 and 28 of cylinder block 34. The motor is idling, the vacuum 23 and solenoid 22 are in position as shown unemployed allowing the spring 35 to hold the unloading port "D" open keeping cylinder chambers 11 and 13 free of pressure while at the same time hydraulic fluid is being entered thru 10-24 and out thru port "D" and 28 14 and 15, simultaneously the centrifugagal force of the adhesion roller means, including planetary gears 45 and heels 57, acting thru the contact plates 50 and 51 and lever 17 plus the hydraulic fluid entering at the two ports of 24 and exhausting at the one port 28 will locate the piston 12 at port 28 at which point the spring 58 also helps in retarding the piston from over travel. Should the unloading port "D" close as by acceleration of the driving motor; the pressure on both sides of the piston will build up keeping the piston 12 located at port 28 as the hydraulic fluid exhausts equally from both sides of the piston 12 into the port 28. Also when shifting the lever 1 into the park position 102 the rod 2 actuates the arm 18 thru a geneva wheel type mechanism with actuating and locking projections 37 as on collar 9 and arm 18; a rod 19 is pivotally secured to arm 18, bears down onto spring 104, as the pawl 21 finds it's alignment with any one of the numerous cogs 38; the spring 104 will then bring the toggle 20 over center in the opposite direction locking the pawl 21 onto the cog 38. Lands 72 on the pawl 21 are shaped to help prevent the pawls 21 from engaging any cog 38 in motion.

The transmission is connected to the power source via the spider 39 as shown; the torque of the engine is passed thru with the levers 1 and 17 positioned simulating third or high speed of the conventional geared transmission 94. At spider 39 the torque is divided to take two routes to the central planetary gearing numbers 45 46 55 and 56. One route of the torque is from 39 to 40 to 41 to the planetary coaxially mounted gears 45 which are in mesh with gears 54 and 55; and are slidably mounted as at 47 on a quadruple helix on the hubs of the inner set of planetary gears 46 which power the gear 56 transmitting the torque to the spider 79 via the clutch teeth at 77; planetary gears 82 transfer the torque to the bevel gear 84 which is to be connected to the drive shaft for the end outlet power.

The radial movement of gears 45 away from center disengages them from gears 54 and 55 leaving it to the contact of the heels 57 of the gears 45 with the contact pressure plates 50 and 51 to transfer the torque allowing for the speed of gear 56 to decelerate to zero as the planetary gears 45 move away from the shown most center position to the neutral 48 position; and reverses the rotation of gears 56 as gears 45 with the heel contact at 57 in adhesion to the plates 50 and 51 under labor, moves still farther out from center to the maximum reverse at 49.

Plate 50 is the action plate and plate 51 reacts; plate 51 is held from rotation by a non reversing lock mechanism 52 when in the third speed position 94 as shown; lock mechanism 52 will not allow plate 51 to revolve counter clock wise as it would without the restriction. When shifted in overdrive at 92, plate 51 is in free wheeling at 53 revolving with the complete unit as one, with no gears individually in motion; in overdrive 92 all the interaction among the planetary gearing is haulted by 69 and 70 being engaged.

When in the high speed position 94 as shown the input torque as always, is clockwise; the reaction on plate 51 is counterclock. The lock mechanism 52 will prevent the counterclock rotation of plate 51. With plate 51 at rest the torque is transfered thru 56–79–82; the torque of 82 is reacted upon by 80 so as to revolve gear 82 meshed with gear 84 which is the final output to adapt to. As shown the engaging splines at 90 are apart so as to allow plate 51 to go from static to clockwise rotation as the lever 17 is positioned at overdrive 92.

As the engine idles, solenoid 22 and vacuum 23 are inactivated—inactivated only if the output speed is below 15 mph—and the unloading port "D" is opened by a spring 35 this allows the piston 12 to relocate at the neutral port 28 with the lever 17 in the neutral position 36. Opening the unloading port "D" allows the piston 12 to relocate at neutral port 28, the lever 17 at 36, but it does not effect the shift lever 1. The centrifugal force of the planetary gearing on shaft 44 wedges the plates 50 and 51 apart, causes the movement at 59 outwardly from center; this effects the levers 17 and 60 to be actuated by the pivot pins 61 on the axially movable bearings 62 and 63; the lever 60 is pivoted at 64 allowing for the free floating linkage of 65 so as to accommodate any minor axial misaligning shift of the gears 45 to the plates 50 and 51.

When the lever 17 is in reverse positioned at 93 the pressure plates 50 and 51 will shift apart; to prevent any clashing of the splines at 90 the clearance is such that the splines mate before the plate 51 is shifted outward sufficiently for the 57 heel to match the neutral 48 on plates 50 and 51; neutral is the position at which the reaction plate 51 changes rotation from counterclock to clockwise as the lever 1 is shifted from overdrive 92 to reverse 93.

The other route of torque from the power source takes off from spider 39 thru planetary gear 40 to gear 42 on shaft 43. Gear 42 has a long extended hub with splines at 67 mating with internal slidable splines on the extended hub of plate 50; in the setting as shown the gears 45 54 and 55 are in mesh transmitting the torque thru the center planetary differential gearing independent of any necessary pressure plate adhesion at 57.

Shifting to the overdrive position 92 the bearings 62 and 63 shift inwardly; the plates 50 and 51 already being at inner most position causes the springs at 68 to compress bringing the brake plates 69 to adhere to the brake drums 70 effecting a complete hault to all gearing within the unit causing it to rotate as one shaft throughout.

When the vehicle is in motion at or above a predetermined speed of 15 mph the solenoid 22 or the vacuum 23 is energised so to hold the unloading port "D" in the closed position. As long as the shift lever 1 is in any position other than neutral 36 or park 93 and the speed of the vehicle is at 15 mph or over, the unloading port "D" is closed. When the vehicle speed is below 15 mph and the engine at idling the unloading port "D" is open. When port "D" is open the spring 58 and the counter effect of the centrifugal force of the planetary gearing 45 will tend to position the piston 12 in the neutral position at 28; effectively also allowing the heels of 57 of the planetary gears 45 to position at neutral 48 on the pressure plates 50 and 51; at this matching of equal diameters of 57 on the gears 45 and position 48 on the plates 50 and 51, the ratios of the torque and speed of the input to the output are zero —neutral—.

As you accelerate the engine speed when shifted in 93 reverse the piston 12 will allow the plates 50 and 51 to shift apart to match 57 to the plates at 49. The most infinitesimal movement of the pressure contact periphery of 57 toward either 49 or 71 on the pressure plates 50 and 51 will in the most infinite way change the speed and torque ratio of the input to the final output; this infinitely large ratio coupled with the coaxial slidably mounted gears 45 on the helical keyways at 47, and the centrifugal force of the planetary gearing 45, will apply substantial pressure at 57 creating the necessary adhesion between contacts at 57 and pressure plates 50 and 51 during acceleration and at the lower speeds of the output.

The pressure contact of 57 on pressure plates 50 and 51 is a manor of synchromesh; in bringing the speed of gears 54 and 55, shrunk into the hubs of plates 50 and 51, to the matching speed of gears 45 as they are slidably forced to mesh as shown eliminates the clash of gears 45 with the gears 54 and 55.

The collar 7 is machined with seven equally spaced indentations to properly fit to, and mate a spring loaded plunger 8 fixed with in a slip fit to the bearing casting 107 employed to hold the different shiftings of lever 1 as selected. The indentations for shift lever 1 in positions 92 94 95 and 96 to be of equal depth and the indents for neutral 36 reverse 93 and park 102 slightly deeper for more holding power of lever 1 so as not to get the shift lever 1 into park or reverse unconsciously; the incline lands of the deeper indentations to be such as will meet the need of safe operation requirements.

To keep the planetary gears 45 in balance: The gears 45 slidably mounted on the hubs of gears 46 are kept diametrically equidistant from the center of the axis 43 by the mechanism shown at FIG. VI. The hubs of gears 46 have four holes 75 to accomodate four cylindrical keys machined to slidably fit the four helical keyways 47; the keys are held in place by collars 73 which also support the yokes concentrically and freely allow the gears 45 to rotate without restriction. Rack gears 91 adjustably mounted on yokes 74, two to a yoke, diametrically opposed meshed with a differential pinion 76 oppose each other equally and provide a static and dynamic counterbalance for gears 46 radially and thereby keep the contact of rollers 46 with the pressure plates 50 and 51 at the very low rpm and at rest as well.

With the shift lever 1 in position 94 as shown a simulation of the conventional third gear, the connecting rod 2 revolves the sectional gear 3 meshed with the pinion 4 secured to spool 5 sufficiently for the holes 94 in spool 5 to match the inlet holes 27 and exhaust holes 31 of the cylinder block 34. The hydraulic fluid enters cylinder 11 at 27 and cannot exhaust until it has forced the piston 12 past drilled port 31 at which point it exhausts finally out thru 14 back to the reservoir not shown.

With the shift lever 1 as shown at 94, the highest ratio; at a 4000 rpm input the output of the transmission at 79 is one third, or 1333 rpm, of the input. The peripheral contact of 57 on plates 50 and 51 is at 2.7" diameter, and at 57 of 45 at a constant 5.4" diameter. At neutral or zero output, the peripheral contact of 57 of 45 and 50 and 51 is at 5.4" diameter; therefore a shift of the peripheral contact point on 50 and 51 from 2.7" diameter to 5.4" diameter changes the output rpm from 1333 to zero in a range of 2.7". Shifting the peripheral contact of 57 radially 0.100" will change the the output rpm by 49.4 rpm at the end spider 79. Shifting the contact periphery radially toward the center axis of 43 increases the rpm, and shifting away from the center of the axis of 43 decreases the rpm; 49.4 rpm for every shift of 0.100" in diameter.

Assuming lever 1 is at 96 similar to conventional 1st gear; gears 45 positioned with heels 57 in contact with diameter 4.75" at 71 on plates 50 and 51 results in 320 rpm output at 79.

Assuming lever 1 is at 95 similar to conventional 2nd gear, gears 45 positioned with heels 57 in contact with diameter 3.8" at 88 on plates 50 and 51 results in 790 rpm output at 79.

Assuming lever 1 is at 94 similar to conventional 3rd gear; gears 45 positioned with heels 57 in contact with diameter 2.7" on plates 50 and 51 as shown, the output at 79 is 1333 rpm. At this most compact positioning of all the central planetary mechanism the gears 45 54 and 45 and 55 are in mesh as a positive drive, independent of any adhesive motive as necessary in the infinite degrees of acceleration up to this speed of rpm output.

In overdrive with lever 1 at 92 the plates 69 and drum 70 are easing into contact the friction between 69 and 70 yields to adhesion and the clutch binds the unit together as a whole with all the planetary gearing static, transfering the rotary input torque from 39 on thru by the transmission as if by a single shaft to 84.

The 1333 rpm of 79 as represented with lever 1 at 94 as shown, compared to the 4000 rpm of 79 with the lever 1 in overdrive at 92 is a ratio of 3 to 1; three times faster in over drive which is not acceptable. Adding the differential gearing at the end of hub 56 will change the ratio of high speed to over drive to this extent: With the input at 39 at 4000 rpm and the output speed setting as shown at 94, the output at the extended hub of 56 clutched to 79 is 1333 rpm. Securing the spider 79 via the clutch teeth at 77 to the extended hub 56 to rotate at 1333 rpm transfers the torque—while the sixty tooth gear 80 is restricted at 52 to rotate—to the fifty tooth gear 84 thru gear 82 at twice the rate of 1333 to 2666 rpm, add this to the additional rpm caused by the ratio of six to five as at 80 to 84 for a total of 3200 rpm at the final output; from 3200 rpm at 94 as shown to 4000 rpm in overdrive is a more acceptable rate. To change the ratio of —high—third— as shown with the lever 1 at 94, change the ratios of the gears 80 and 84.

The speed of a vehicle with 14" rolling radius tires at 720 rpm equivalent to 60 mph, with an axle ratio of 3.33:1, with the engine rpm at 4000, with shift in —high——third— as shown:
$4000 \times 0.33\% = 1333 \times 2 = 2666 \div 50 \times 60 = 3200 \div 3.33 = 960 \div 720 \times 60 = 80$ mph in —high—third— as shown.
In overdrive with these same factors: $4000 \div 3.33 = 1200 \div 720 \times 60 = 100$ mph.

Ports 26 27 28 29 30 31 32 and 33 have drilled and tapped access holes 89 to accomodate manually or automatically adjustable restricting valves—plungers—to allow for the fine tuning of the hydraulic fluid flow to the cylinder chambers 11 and 13 in establishing the proper speed of the lateral movement of gears 45 in relation to the speed and torque of the input.

From the afore description it is understood that modifications and/or additions necessary to the implementation and enhancement of aspects of this invention can be made without in any manner changing or losing the principles in the description set forth in the letter and the affixed claims.

Various modes of carrying out the invention are contemplated as being within the scope of the following claims particularly pointing out and distinctly claiming the subject-matter regarded as the nature of the invention.

I claim:

1. A device for transmitting power between an input shaft and an output shaft in a continuously, infinitely variable ratio, comprising a plurality of adhesion rollers mounted radially of said input and output shafts in diammetrically opposed relation to one another and movable radially of said shafts under centrifugal force imparted thereto by the rotation of said shafts, a pair of self-adjusting, floating disks mounted to either side of said adhesion rollers and engageable with said rollers, the said disks being movable relatively of one another and axially of said shafts to vary the radial position of said adhesion rollers relatively thereto whereby to vary the rate of rotation of said disks, and planetary gear means for coupling said input and output shafts to one another and responsive to variations in the rate of rotation of the disks to vary the speed ratio between the input and output shafts, said adhesion rollers having gear teeth formed on their radially inner surfaces and serving to positively couple said input shaft to said output shaft when said adhesion rollers are in a radially inner-most position relatively of said shafts.

2. The construction of claim 1 wherein one of said disks is an action element and the other is a reaction element and including brake means for holding the disk which serves as a reaction element against rotation when the adhesion rollers are in a radially outermost position with respect to said input and output shafts.

3. In a device for transmitting power at an infinitely variable speed ratio, an input shaft, an output shaft, an intermediate shaft between and in axial alignment with said input and output shafts, at least a pair of spokes projecting radially outwardly from said intermediate shaft in diammetrically opposed relation to one another, a bevel gear means mounted to each of said spokes, said gears having an extended outer hub disposed coaxially of said spoke, said gear forming a part of a planetary gear means for transmitting a portion of the power from said input shaft to said output shaft, adhesion roller means mounted to the extended hub of each of said gears and movable axially of said hubs in response to centrifugal action as said intermediate shaft is rotated, a pair of conical disks mounted coaxially of said intermediate shaft on either side of said spokes and frictionally engageable with said roller means, the said adhesion rollers and conical disks forming a speed changer for varying the speed ratio between said input and output shafts, and means for varying the spacing between said disks whereby to vary the axial position of said adhesion roller means on said gear hubs thereby varying the point of contact of said roller means on said disks to vary the speed ratio between said input and output shafts.

4. The construction of claim 3 wherein said adhesion roller means are formed integrally with gear means forming a part of a power train between said input and output shafts when said adhesion roller means are in a radially innermost position on said spokes.

5. The construction of claim 3 wherein said extended hubs of the gear means are provided with helical grooves and said adhesion roller means are provided with keys slidably received in said grooves to secure said roller means to said hubs for axial slide movement.

6. The construction of claim 3 including rack and pinion means associated with said roller adhesion means for providing a static and dynamic counterbalance to said roller means and thereby maintain the latter in contact with said conical disks at low speeds.

7. In a device for mechanically transmitting power from an input shaft to an output shaft at an infinitely variable speed ratio, a shaft disposed intermediately of and in axial alignment with the input and output shafts, a pair of opposed conical coaxially of said shaft and rotatable in opposite directions relatively of one another, adhesion roller means disposed between said disks and cooperating therewith to form a variable speed drive transmission means, said adhesion roller means slidably mounted on radially extending shafts secured to and revolvable as a unit with said intermediate shaft, and planetary gearing associated with said intermediate shaft connecting the adhesion roller means with the input shaft through said speed changer and connecting the input and output shafts whereby a portion only of the transmittal power flows through the variable speed drive transmission means.

8. The construction of claim 7 wherein said adhesion roller means have gear teeth formed integrally therewith as a unitary structure and wherein said planetary gearing includes gear means cooperating with said gear teeth responsive to said adhesion roller means being in a radially innermost position on said radially extending mounting shafts to positively engage said input shaft with said output shaft.

9. The construction of claim 8 wherein one of said disks is an action element and the other is a reaction element.

10. The construction of claim 7 wherein said conical disks are mounted for axial slide movement relatively of said intermediate shaft whereby to vary the radial distance of the point of contact of said adhesion rollers on said disks from the axial centerline of said input and output shafts, and including hydraulic control means for remotely controlling the axial position of said disks relatively of said intermediate shaft.

11. The construction of claim 7 including brake shoe means selectively engageable with both said conical disks whereby to cause all said planetary gearing elements to rotate as a unit and thereby eliminate relative movement between said elements.

* * * * *